United States Patent
Tenny et al.

(10) Patent No.: US 10,178,702 B2
(45) Date of Patent: Jan. 8, 2019

(54) SYSTEM AND METHOD FOR CELL SWITCHING

(71) Applicant: Futurewei Technologies, Inc., Plano, TX (US)

(72) Inventors: Nathan Edward Tenny, Poway, CA (US); Xuelong Wang, Beijing (CN); Haibo Xu, Beijing (CN); Hao Bi, Lake Zurich, IL (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 0 days.

(21) Appl. No.: 15/478,908

(22) Filed: Apr. 4, 2017

(65) Prior Publication Data
US 2017/0359848 A1     Dec. 14, 2017

Related U.S. Application Data

(60) Provisional application No. 62/348,475, filed on Jun. 10, 2016.

(51) Int. Cl.
*H04W 76/00* (2018.01)
*H04W 76/04* (2009.01)
(Continued)

(52) U.S. Cl.
CPC ....... *H04W 76/046* (2013.01); *H04W 36/023* (2013.01); *H04W 36/04* (2013.01);
(Continued)

(58) Field of Classification Search
CPC ... H04W 76/046; H04W 24/02; H04W 36/04; H04W 36/023; H04W 64/00; H04W 88/085; H04W 92/12; H04L 69/324
See application file for complete search history.

(56) References Cited

U.S. PATENT DOCUMENTS

| | | | |
|---|---|---|---|
| 8,391,149 B2* | 3/2013 | Casati | H04W 36/02 370/235 |
| 2005/0185619 A1* | 8/2005 | Niemela | H04W 36/18 370/331 |

(Continued)

FOREIGN PATENT DOCUMENTS

| | | |
|---|---|---|
| CN | 101779489 A | 7/2010 |
| WO | 2015131926 A1 | 9/2015 |

OTHER PUBLICATIONS

"3rd Generation Partnership Project; Technical Specification Group Radio Access Network; Radio Resource Control (RRC); Protocol specification (Release 13)," 3GPP TS 25.331, V13.2.0, Mar. 2016.

(Continued)

*Primary Examiner* — Khai M Nguyen
(74) *Attorney, Agent, or Firm* — Slater Matsil, LLP

(57) ABSTRACT

A method for operating a first distributed unit (DU) includes participating in a link layer context transfer with a second DU, establishing a user data path for a mobile device, the user data path connecting the mobile device with a centralized unit (CU) including a radio control protocol entity communicating with the mobile device, and storing first user data for the mobile device received from the CU and second user data for the mobile device received from the second DU. The method includes establishing a connection with the mobile device, sending the first user data and the second user data to the mobile device, and adapting the link layer context to operate in the first DU for exchanging data between the CU and the mobile device, wherein adapting the link layer context includes associating an uppermost protocol layer of the first DU with a lowest protocol layer of the CU.

24 Claims, 10 Drawing Sheets

(51) Int. Cl.
*H04W 36/04* (2009.01)
*H04W 64/00* (2009.01)
*H04W 36/02* (2009.01)
*H04L 29/08* (2006.01)
*H04W 24/02* (2009.01)
*H04W 88/08* (2009.01)
*H04W 92/12* (2009.01)

(52) U.S. Cl.
CPC ............ *H04W 64/00* (2013.01); *H04L 69/324* (2013.01); *H04W 24/02* (2013.01); *H04W 88/085* (2013.01); *H04W 92/12* (2013.01)

(56) References Cited

U.S. PATENT DOCUMENTS

| | | | |
|---|---|---|---|
| 2009/0124259 A1* | 5/2009 | Attar | H04L 47/10 455/436 |
| 2009/0245201 A1* | 10/2009 | Motegi | H04L 49/90 370/331 |
| 2010/0002650 A1* | 1/2010 | Ahluwalia | H04L 1/1874 370/331 |
| 2010/0062774 A1* | 3/2010 | Motegi | H04W 36/02 455/437 |
| 2010/0091734 A1* | 4/2010 | Park | H04W 92/20 370/331 |
| 2010/0189076 A1* | 7/2010 | Kim | H04W 36/385 370/331 |
| 2015/0304913 A1 | 10/2015 | Uusitalo et al. | |
| 2018/0014228 A1* | 1/2018 | Ahluwalia | H04W 36/0033 |
| 2018/0227919 A1* | 8/2018 | Lee | H04W 72/0453 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 13)," 3GPP TS 36.300, V13.3.0, Mar. 2016, 295 pages.

Alnas, et al., "Enhanced Mobile IP Handover Using Link Layer Information," International Journal of Computer Science and Security, (IJCSS), vol. 4, Issue 6, May 2012, pp. 598-610.

Mohanty, et al., "A Cross-Layer (Layer 2 + 3) Handoff Management Protocol for Next-Generation Wireless Systems," IEEE Transactions on Mobile Computing, vol. 5, No. 10, Oct. 2006, pp. 1347-1360.

Oh, et al., "Seamless Fast Handover in Mobile IPv4 Using Layer-2 Triggers," IEEE Computer Society, Second International Converence on Systems and Networks Communications (ICSNC 2007), Aug. 25-31, 2007, 5 pages.

Oh, et al., "Enhanced Layer-3 Handover Using the Layer-2 Triggers," 2006 1st International Symposium on Wireless Pervasive Computing, Jan. 16-18, 2006, 3 pages.

Mun, et al., "Enhanced Fast Handover for Mobile IPv6 based on IEEE 802.11 Network," Mipshop Working Group, https://tools.ietf.org/html/draft-mun-mipshop-efh-fast-mipv6-03, Feb. 2009, 12 pages.

Varis, et al., "A Layer 2 Approach for Mobility and Transport in the Mobile Backhaul," 2011 11th International Conference on ITS Telecommunications, Aug. 23-25, 2011, pp. 268-273.

CMCC, "Mobility management for connected mode in NR," 3GPP TSG-RAN Meeting #94, Agenda Item 9.5.1, R2-163719, Nanjing, China, May 23-27, 2016, 4 pages.

* cited by examiner

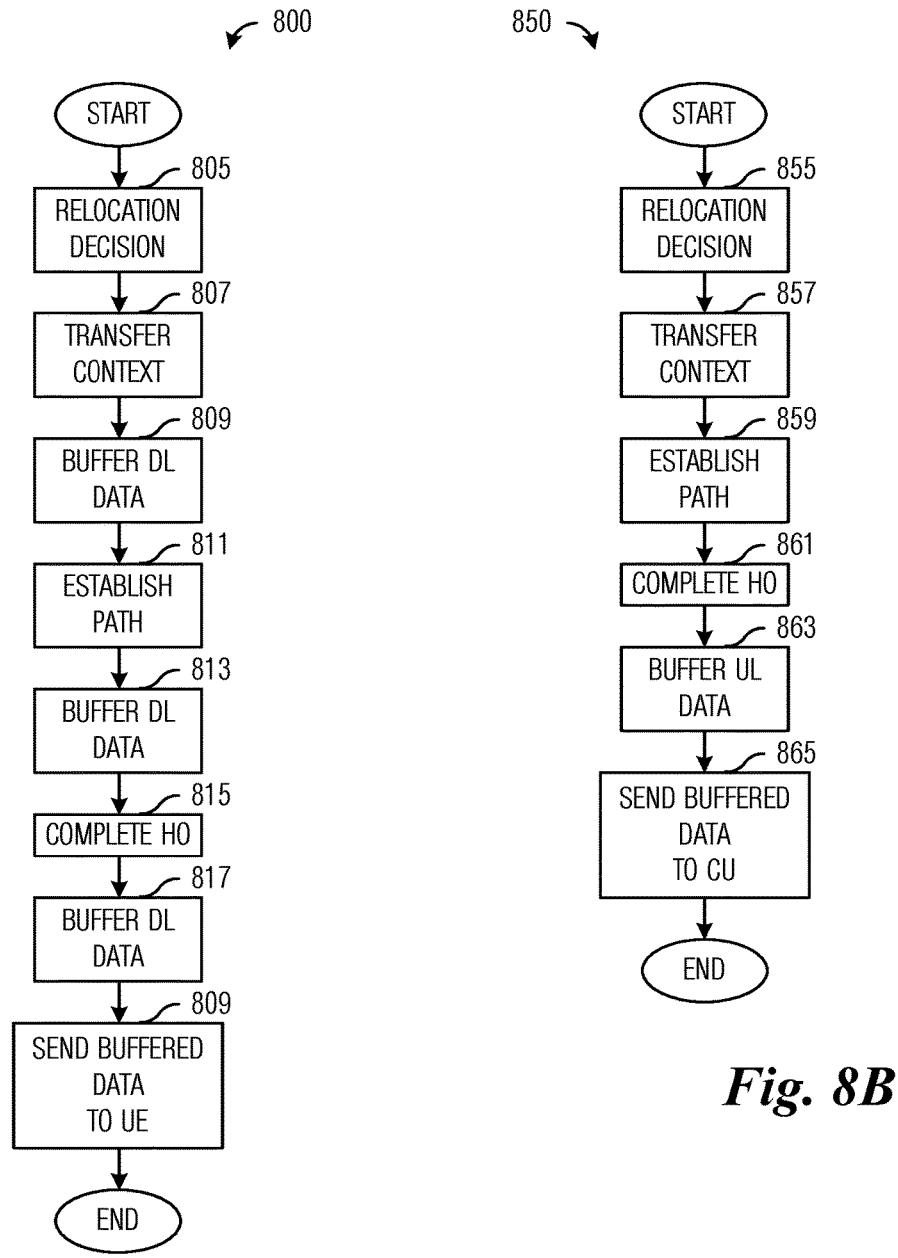

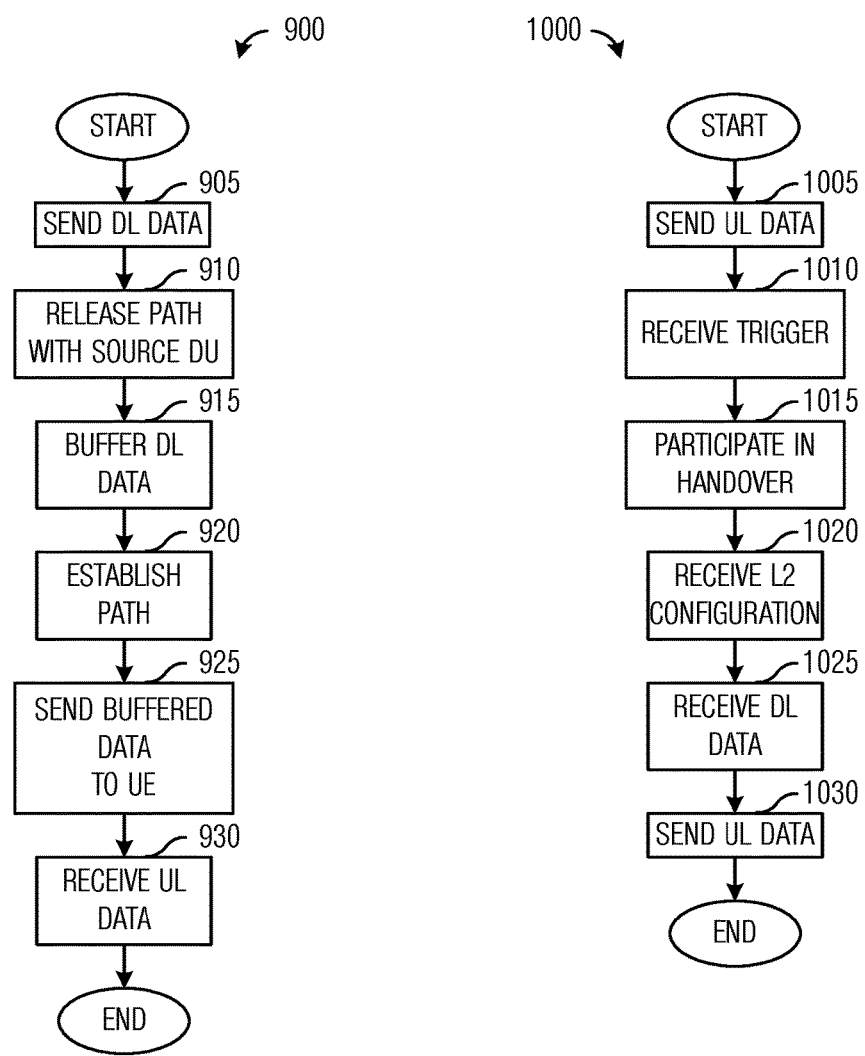

SYSTEM AND METHOD FOR CELL SWITCHING

This application claims the benefit of U.S. Provisional Application No. 62/348,475, filed on Jun. 10, 2016, entitled "System and Method for Cell Switching," which application is hereby incorporated herein by reference.

TECHNICAL FIELD

The present invention relates generally to a system and method for digital communications, and, in particular embodiments, to a system and method for cell switching.

BACKGROUND

The new radio (NR) design for Fifth Generation (5G) cellular radio access technology (RAT) is widely assumed to divide radio network functionality between entities referred to as centralized units (or control units) (CU) and distributed units (DU). The division of the radio protocol stack between these entities may be flexible, but at least it is expected that the upper layers, e.g., the user plane comprising the packet data convergence protocol (PDCP) sublayer and the control plane comprising the PDCP+radio resource control (RRC) sublayers would be in the CU, while the physical (PHY) sublayer would be in the DU. The intervening Layer 2 sublayers may be in either the CU or the DU. However, it is likely that the media access control (MAC) sublayer would also be located in the DU to avoid backhaul latency in the scheduling process.

SUMMARY

Example embodiments provide a system and method for cell switching.

In accordance with an example embodiment, a method for operating a first distributed unit (DU) is provided. The method includes participating, by the first DU, in a link layer context transfer with a second DU, establishing, by the first DU, a user data path for a mobile device, the user data path connecting the mobile device with a centralized unit (CU) including a radio control protocol entity communicating with the mobile device, storing, by the first DU, first user data for the mobile device received from the CU, storing, by the first DU, second user data for the mobile device received from the second DU, establishing, by the first DU, a connection with the mobile device, sending, by the first DU, the first user data and the second user data to the mobile device, and adapting, by the first DU, the link layer context to operate in the first DU for exchanging data between the CU and the mobile device, wherein adapting the link layer context includes associating an uppermost protocol layer of the first DU with a lowest protocol layer of the CU.

The method also includes storing, by the first DU, third user data for the CU received from the second DU, and sending, by the first DU, the third user data to the CU. The first user data is sent after sending the second user data. The first DU is a target DU and the second DU is a source DU. Participating in the link layer context transfer includes receiving the link layer context from the second DU. The link layer context is for the mobile device.

In accordance with an example embodiment, a method for operating a second DU is provided. The method includes participating, by the second DU, in a link layer context transfer with a first DU, releasing, by the second DU, a user data path for a mobile device with a CU including a radio control protocol entity communicating with the mobile device, storing, by the second DU, first user data for the mobile device received from the CU, receiving, by the second DU, a first indication indicating that a connection with the mobile device is established, and sending, by the second DU, the first user data to the mobile device.

The method also includes storing, by the second DU, second user data for the CU received from the mobile device, and sending, by the second DU, the second user data to the CU after receiving the first indication. The method also includes sending, by the second DU, a second indication prompting the mobile device to transfer a link layer associated with the mobile device to the first DU.

In accordance with an example embodiment, a method for operating a CU is provided. The method includes participating, by the CU, in a release of a first path between the CU and a first DU, storing, by the CU, first user data for a mobile device, participating, by the CU, in an establishment of a second path between the CU and a second DU, and sending, by the CU, the first user data to the second DU.

The method also includes sending, by the CU, second user data for the mobile device to the first DU prior to releasing the first path. The method also includes receiving, by the CU, third user data from the second DU.

In accordance with an example embodiment, a method for operating a mobile device is provided. The method includes receiving, by the mobile device, an indication prompting the mobile device to transfer a link layer associated with the mobile device to a first DU, participating, by the mobile device, in a handover with the first DU and a second DU, and receiving, by the mobile device, first user data from the second DU.

The method also includes sending, by the mobile device, second user data to the first DU prior to participating in the handover. The method also includes receiving, by the mobile device, Layer 2 configuration information. The method also includes sending, by the mobile device, third user data to the second DU after participating in the handover. The Layer 2 configuration information includes information related to a connection between the mobile device and the second DU.

In accordance with an example embodiment, a first DU is provided. The first DU includes one or more processors, and a computer readable storage medium storing programming for execution by the one or more processors. The programming including instructions to configure the first DU to participate in a link layer context transfer with a second DU, establish a user data path for a mobile device, the user data path connecting the mobile device with a CU including a radio control protocol entity communicating with the mobile device, store first user data for the mobile device received from the CU, store second user data for the mobile device received from the second DU, establish a connection with the mobile device, send the first user data and the second user data to the mobile device, and adapt the link layer context to operate in the first DU for exchanging data between the CU and the mobile device, wherein adapting the link layer context includes associating an uppermost protocol layer of the first DU with a lowest protocol layer of the CU.

The programming includes instructions to configure the first DU to store third user data for the CU received from the second DU, and send the third user data to the CU. The programming includes instructions to configure the first DU to receiving the link layer context from the second DU.

Practice of the foregoing embodiments enables Layer 2 mobility of a user equipment between distributed units.

Therefore, burdensome Layer 3 signaling between the user equipment and the centralized unit is avoided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 8A illustrates a flow diagram of example operations occurring in a target DU participating in a Layer 2 switch highlighting downlink communications according to example embodiments described herein;

FIG. 8B illustrates a flow diagram of example operations occurring in a target DU participating in a Layer 2 switch highlighting uplink communications according to example embodiments described herein;

FIG. 9 illustrates a flow diagram of example operations 900 occurring in a CU participating in a Layer 2 switch according to example embodiments described herein;

FIG. 10 illustrates a flow diagram of example operations 1000 occurring in a UE participating in a Layer 2 switch according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
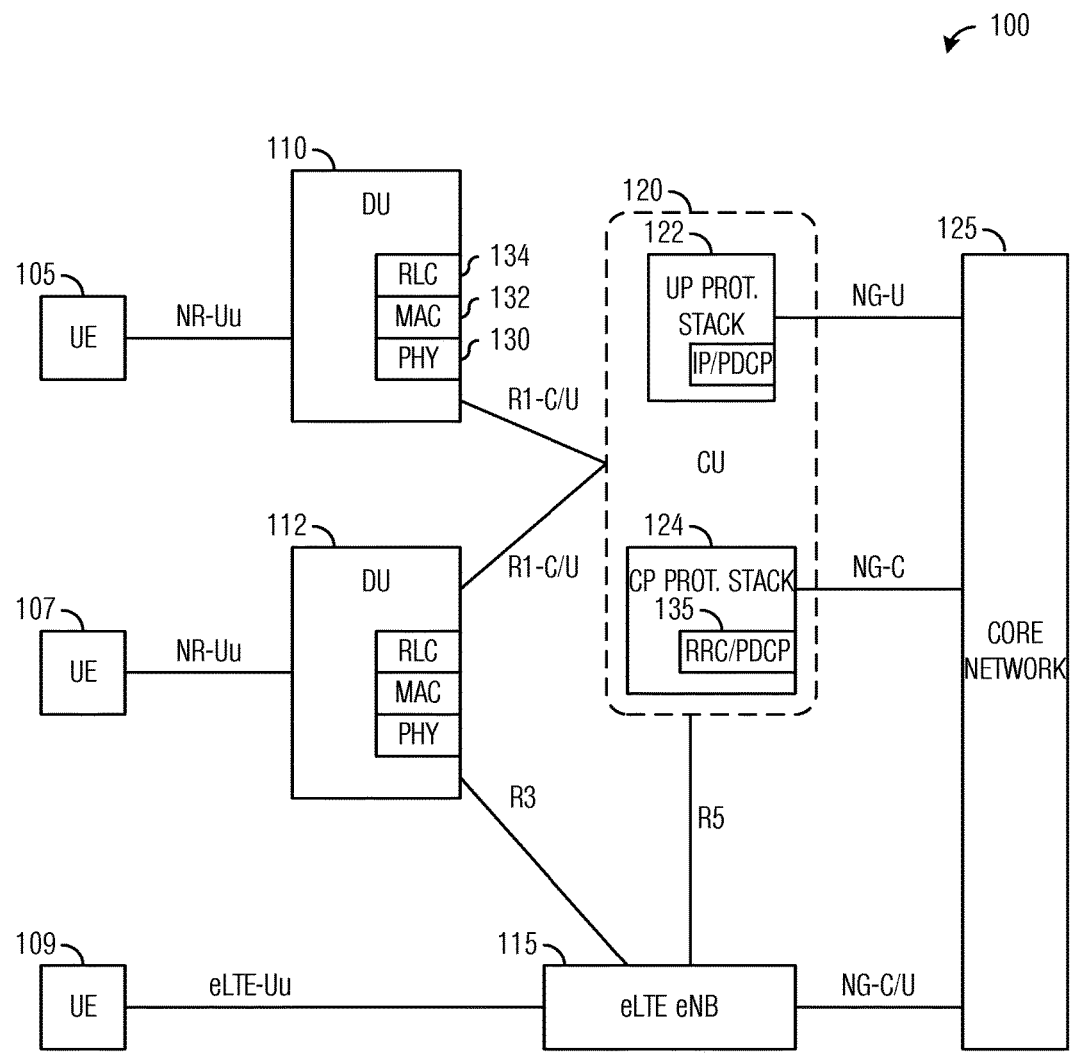
FIG. 1 is an example communications system according to example embodiments described herein.

FIG. 1 shows an example communications system 100. Communications system 100 is a 5G cellular system. Communications system 100 includes a plurality of user equipments (UEs), such as UE 105, UE 107, and UE 109. Communications system 100 also includes distributed units (DUs), such as DU 110 and DU 112. Communications system 100 also includes an enhanced LTE (eLTE) evolved NodeB (eNB) 115 that serves UE 109, for example, without utilizing the NR design. Communications system 100 also includes a remote centralized unit (CU) 120, which includes a user plane (UP) protocol stack 122 and a control plane (CP) protocol stack 124. CU 120 is connected to the DUs, as well as eLTE eNB 115 and core network (CN) 125.

While it is understood that communications systems may employ multiple network entities capable of communicating with a number of UEs, only two DUs and one eLTE eNB, and three UEs are illustrated for simplicity. In addition, it should be understood that the network topology in FIG. 1 is exemplary, and particular networks may embody different topologies. For instance, the DUs of a communications system might not connect directly to the eNBs of an eLTE system (interface R3 in the figure), and some 5G cellular systems could operate in a so-called "standalone" mode without interworking with any neighbouring eLTE system. Therefore, the communications system shown in FIG. 1 should not be construed as being limiting to either the scope or spirit of the example embodiments.

As discussed previously, DUs implement a portion of the protocol stack. As shown in FIG. 1, the DUs include PHY sublayer, MAC sublayer, and radio link control (RLC) sublayer entities. As an illustrative example, DU 110 includes PHY sublayer entity 130, MAC sublayer entity 132, and RLC sublayer entity 134. The CUs and UPs also implement a portion of the protocol stack. As shown in FIG. 1, the CUs and the UPs implement IP and PDCP layer/sublayer entities in the user plane, and RRC and PDCP layer/sublayer entities in the control plane. As an illustrative example, the control plane protocol stack 124 of CU 120 includes RRC/PDCP sublayer entity 135. Although the RRC and PDCP entities are shown as a combined entity 135, they may be implemented as a single entity or as separate entities, depending on the implementation of the CU.

Communications system 100, as shown in FIG. 1, illustrates a hierarchical model of the NR design of a 5G cellular system, with one CU managing many DUs (e.g., CU 120 managing DUs 110 and 112). The hierarchical model shown in FIG. 1 illustrates a centralized CU and distributed DUs. Although the NR design may be extended to situations with more than one CU, FIG. 1 focuses on the portion of an NR radio access network under the management of one CU. In general, a UE is served by a DU, and as a UE moves around, the link between UE and DU is relocated or switched to different DUs. It is noted that Layer 3 control is located at the CU. As a result, the relocation of the UE's link to a different DU under the control of the same CU does not require a corresponding relocation of the layer 3 anchor point for the UE.

However, the locating of the Layer 3 in the CU may lead to long latency for air interface signaling when layer 3 procedures are used. The signaling exchange between the CU and the DU is not amenable in situations that involve delay sensitive signaling or services. The magnitude of delay involved depends on various factors such as the transport used for the CU-DU interface (R1-C/R1-U interface in FIG. 1), the amount of network load managed by the CU, etc.

Layer 2 protocol sublayers are split between the CU and the DU so that a first sublayer of packet processing (the PDCP sublayer) as well as security is located in the CU and the MAC and PHY sublayers are in the DU. The reliability sublayer (the RLC sublayer) may be located in either the CU or the DU (although shown being located in the DU in FIG. 1). In some situations, the locating of the RLC sublayer in the CU, or even dividing RLC functionality between the CU and DU, may be effective. Other layers or sublayers may be present, but are not shown.

The discussion presented herein utilizes the following terms:

Transmission-reception point (TRP): a device that is capable of transmitting and receiving, such as a DU, an eNB. A TRP may also be referred to as a remote radio unit (RRU).

CU: a central entity for control, for both control plane (CP) and UP. The protocol layers located in the CU comprise the controlling protocol layer for CP functions, e.g. an RRC protocol sublayer, as well as the layer/sublayer that controls transport functions for the user plane, e.g. a PDCP sublayer. Logically, a single CU can manage one or multiple cell anchor points, such as DUs, eNBs, gNBs (the accepted acronym for the NR equivalent of eNBs), and so on. RRC/PDCP sublayers are located in the CU.

DU: a distributed entity for radio deployment. One DU may be connected to one or multiple RRUs or TRPs. MAC/PHY sublayers are located in the DU, as well as possibly the RLC layer.

Physical cell: a sector of a TRP/RRU or a cluster of one or more TRP/RRUs coordinated to appear as a single object in radio layers. As defined for a traditional cell, the identity of a physical cell, e.g., a physical cell identity (PCI), is unique in a limited coverage area.

Cell anchor point: a Layer 3 concept of cell at the RRC layer and NG-C interface. The cell anchor point is also referred to as a Layer 3 anchor. One cell anchor point can be mapped to multiple physical cells (as defined in Layer 2). A global cell identifier (e.g., a cell global identity (CGI) in 3GPP LTE) may be defined at the Layer 3 anchor.

In current generation cellular systems, a cell is shared across Layers 1, 2, and 3. At Layers 1 and 2, the cells are distinguished by their PCI, while the CGI is used to identify the cells in Layer 3. However, the PCI and the CGI define the same scope in 3GPP LTE, that is, a particular LTE cell has exactly one PCI and exactly one CGI. The identifiers are different only to allow for a longer globally unique identifier in Layer 3.

According to an example embodiment, the cell structure is decoupled between Layers 2 and 3. It is assumed that the Layer 1 cell or coverage area is transparent to Layers 2 and 3. The cell concept at Layer 2 is referred to as a physical cell. Because the physical cell in 3GPP LTE is distinguished by the PCI, the Layer 2 is the lowest level where a cell is visible in higher layer protocols.

Figure 2:
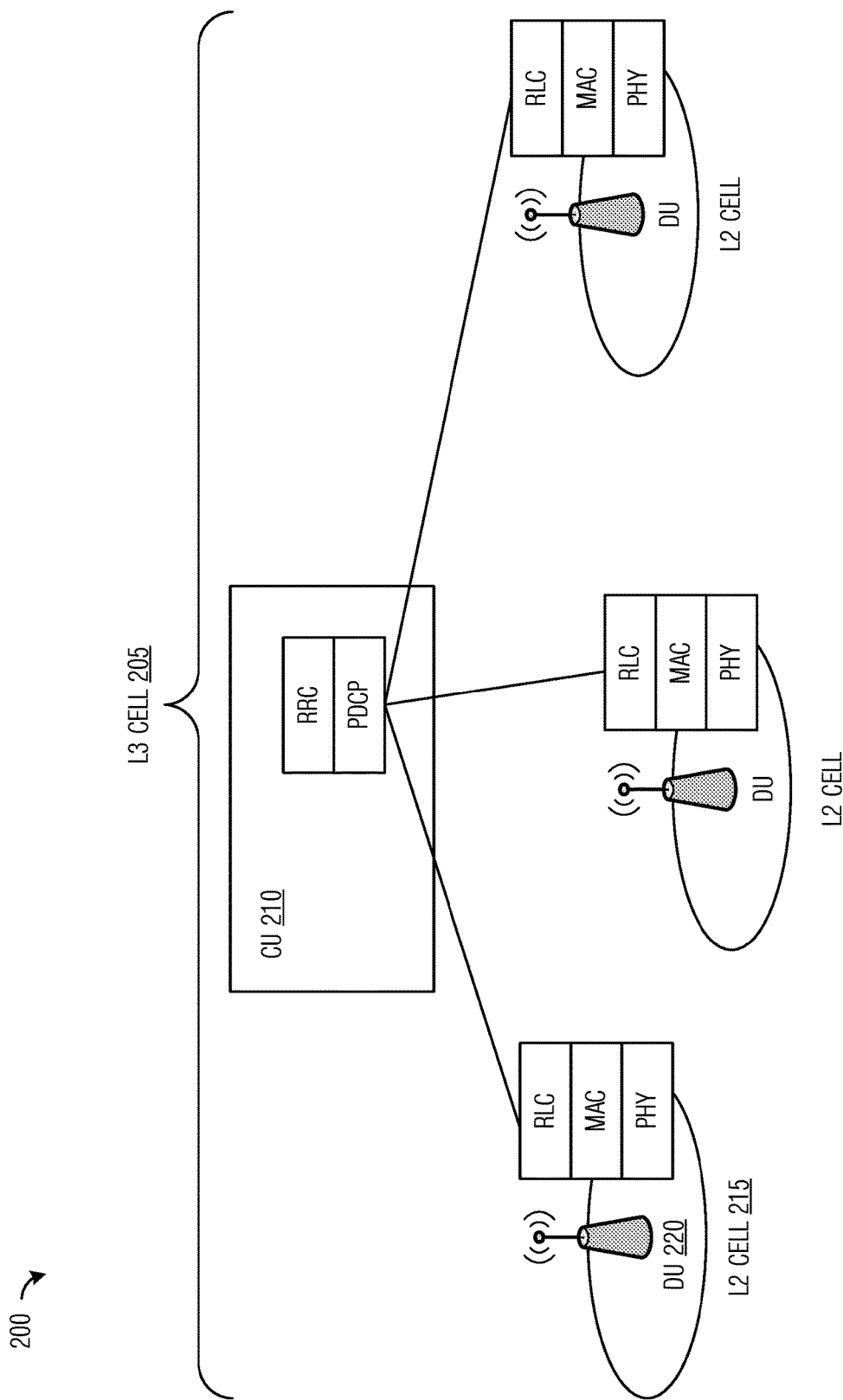
FIG. 2 is a high level view of an example communications system according to example embodiments described herein.

According to an example embodiment, a hierarchical model is presented with a Layer 3 cell (e.g., a CU) managing multiple Layer 2 cells (e.g., DUs). Therefore, the cell structure is decoupled between Layers 2 and 3. Although the term cell is used, other terms, such as anchor point, DU area, and so on, may be used. FIG. 2 illustrates a high level view of an example communications system 200. Communications system 200 includes a Layer 3 cell 205. Layer 3 cell 205 comprises a CU 210 managing a plurality of Layer 2 cells. Each Layer 2 cell is implemented as a DU. As an example, Layer 2 cell 215 is implemented as DU 220. In some deployments, a CU comprises multiple Layer 3 cells, each with its own complement of Layer 2 cells.

According to an example embodiment, at least some of the functionality that in current cellular systems would be embodied in RRC control signaling is relocated to DUs (Layer 2). The control signaling at the DUs may be performed through signalling at any of various Layer 2 sublayers, e.g., the RLC or MAC sublayers, to speed up the procedure and to avoid unnecessary signaling overhead. Furthermore, no Layer 3 RRC handling at the CU is involved as long as the DUs can handle the coordination between the DUs and UEs at Layer 2 to support the concerned functionality. Additionally, consideration of user plane aspects is provided. As an example, handovers between physical cells (Layer 2 mobility) while cell anchor point remains the same (avoiding Layer 3 mobility) are considered. Table 1 illustrates 3GPP LTE RRC functions with equivalent 5G functions, showing a division into 5G RRC (Layer 3) procedures and 5G Layer 2 procedures. For example, as shown in Table 1, the LTE handover procedure may be realised separately in Layer 2 and Layer 3 in a 5G system: A handover (physical cell change) may be implemented via a Layer 2 cell change (L2CC) when the mobility affects the Layer 2 anchor point, e.g., DU, and additionally may be implemented via a Layer 3 RRC connection

TABLE 1

3GPP LTE RRC Functions with Equivalent 5G Functions.

| LTE RRC functions | LTE RRC ->5G RRC | LTE RRC ->5G L2 |
|---|---|---|
| System information | X | Possible (e.g. specific SIB for L2 configuration) |
| Radio resource configuration | X | Possible (e.g. Neighbour Cell List, MAC configuration) |
| Paging | X | |
| RRC connection establishment | X | X |
| RRC connection re-establishment | (L3 connection control) | (L2 connection control) |
| RRC connection release | | |
| RRC connection reconfiguration with mobility control (Handover) | X (L3 Cell Change) | X (Layer 2 Cell Change) |
| Radio link failure related actions | | X (Detection of RLF) |
| Measurements | X (L3 Measurements) | X (L2 Measurements) |
| Security | X | Possible (L2 security procedures) |

TABLE 1-continued

3GPP LTE RRC Functions with Equivalent 5G Functions.

| LTE RRC functions | LTE RRC ->5G RRC | LTE RRC ->5G L2 |
|---|---|---|
| Inter-RAT mobility | X | |
| RRC state manangement (including Idle) | X | |
| MBMS | X | |
| other L3 procedure (e.g. Mobility history info) | X | |

According to an example embodiment, the Layer 2 relocation decision is made in the network (e.g., DUs, CU, CN, and so on) based on Layer 2 and/or Layer 3 measurements. The measurements may be made by the network based on uplink signals, made by the UE based on downlink signals and reported to the network, or a combination of the two. The Layer 2 relocation may involve one or more DUs, the CU, and so on, but the details are transparent to the UE. As an example, a source DU (the DU that the UE is currently attached to) makes a decision on inter-DU switching. The decision power of a DU may need to be authorized a priori by the CU. In a situation when a decision regarding DU switching is made, the DU reports the decision to the CU to prepare the CU for data delivery path switching associated with Layer 2 switching. Other nodes such as potential target DUs, one or more CUs, etc. may also contribute to the decision on switching.

An example Layer 2 switching procedure includes:

Lower layer context is passed from the source DU to the target DU (the DU that the UE is to become attached to after completion of the Layer 2 relocation). The source DU transfers the RLC context for the radio link to the target DU, for example.

The data delivery path switches from source DU<->CU to target DU<->CU.

Layer 2 switching is ordered to the UE from the source DU using Layer 2 control signalling, e.g., a MAC control element (MAC CE). The UE is triggered to begin communications with the target DU, using the same Layer 2 configuration as used with the source DU modified according to any changes in the Layer 2 configuration indicated in the Layer 2 switch order, for example.

Airlink data communications begin when the UE is detected by the target DU, such as during an access procedure.

Variations of the Layer 2 switching procedure include a break before make procedure where the connection with the source DU is broken prior to the establishment of the connection with the target DU, as well as a make before break procedure, where the connection with the target DU is made before the connection with the source DU is broken. For the Layer 2 switching procedures discussed herein, it is assumed that the RLC is located in the DU; therefore, the data packets exchanged between the CU and the DUs are RLC service data units (SDUs), which are equivalent to PDCP protocol data units (PDUs). Alternatively, if the RLC is in the CU, the packets would be MAC SDUs, which are equivalent to RLC PDUs. In general, the data consists of SDUs of the top layer or sublayer in the DU, which are PDUs of the bottom layer or sublayer in the CU.

Figure 3:
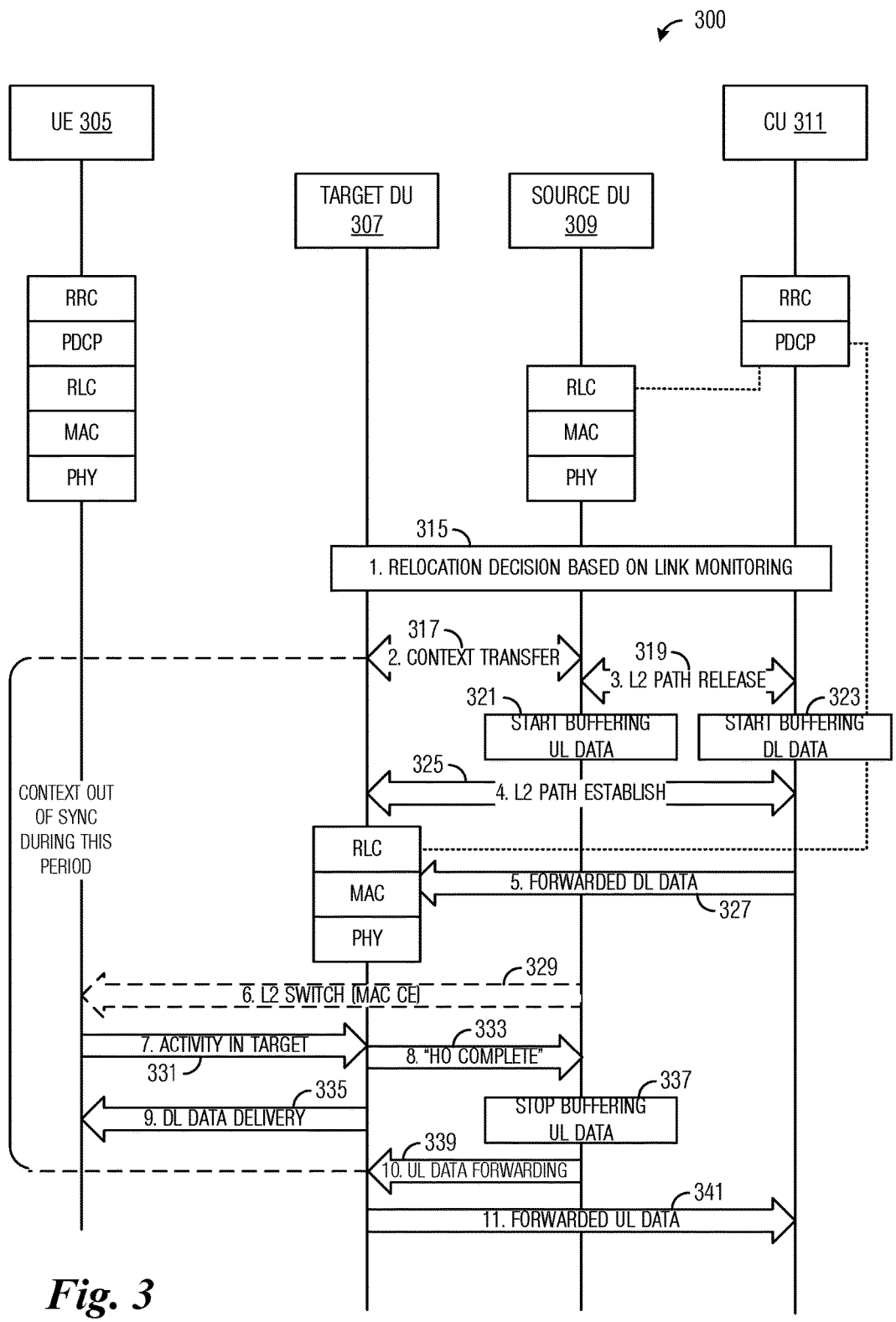
FIG. 3 is a diagram of an example break before make Layer 2 switching procedure according to example embodiments described herein.

FIG. 3 illustrates a diagram 300 of an example break before make Layer 2 switching procedure. Diagram 300 illustrates messages exchanged and processing performed by a UE 305, a target DU 307, a source DU 309, and a CU 311 participating in a break before make Layer 2 switching procedure. Diagram 300 also illustrates protocol stacks at the various devices and relationships between the protocol stacks.

A relocation decision is made based on link monitoring and measurements thereof (block 315). The relocation decision may be made by source DU 309, target DU 307, and/or CU 311. As an illustrative example, network monitoring of uplink signals transmitted by UE 305 is used as a criterion for the relocation decision. Source DU 309 and target DU 307 participate in a context transfer (event 317). Source DU 309 and CU 311 participate in a Layer 2 path release (event 319). After the context transfer completes, source DU 309 stops delivering data from UE 305. Instead, source DU 309 buffers uplink data for later forwarding (block 321). At substantially the same time, CU 311 stops delivering data to UE 305. Instead, CU 311 buffers downlink data for later forwarding (block 323). In between the start of event 317 and the end of event 319, downlink data for UE 305 may arrive at source DU 309. Source DU 309 cannot deliver such data because it has already begun to transfer the Layer 2 context to target DU 307; instead, source DU 309 buffers the downlink data and forwards the downlink data to target DU 307 at a later time, after completion of the handover, for example. Diagram 300 does not illustrate the arrival of the downlink data, the buffering of the downlink data, or the forwarding of the downlink data. The amount of downlink data to be buffered and forwarded in this way would be expected to be small, since the procedures of steps 317 and 319 should preferably be as nearly simultaneous as possible. Similarly, because the connection between UE 305 and target DU 307 has not been established at this point, CU 311 buffers downlink data intended for UE 305 (block 323) and later forwards it to target DU 307 as described below (event 327).

CU 311 and target DU 307 participate in establishing a Layer 2 path (event 325). With the Layer 2 path established between CU 311 and target DU 307, CU 311 forwards downlink data buffered by CU 311 to target DU 307 (event 327). Source DU 309 sends an airlink triggering event, such as a Layer 2 switch instruction (e.g., a MAC CE) to UE 305 (event 329). The airlink triggering event may be optional because the Layer 2 switch may occur without the airlink triggering event, e.g., based on an autonomous decision by the UE, on a UE behaviour controlled by previously configured parameters determined by the network, etc. Activity between UE 305 and target DU 307 (event 331) occurs, such as a random access procedure, an uplink transmission by the UE, etc., and target DU 307 sends a handover complete indication to source DU 309 (event 333). Target DU 307 sends downlink data to UE 305 (event 335). The handover complete indication at event 333 may be an indication to source DU 309 that UE 305 has been detected by, or become connected to, target DU 307. The handover complete indication is not assumed to be a forwarded message from UE 305. In this manner, the example embodiment differs from a 3GPP LTE handover.

With the handover complete, source DU 309 stops buffering uplink data (block 337) and sends buffered uplink data to target DU 307 (event 339) for subsequent forwarding to CU 311 (event 341). Alternatively, source DU 309 may forward the buffered uplink data directly to CU 311, but this approach has a cost in potential extra data transmission resulting from a Layer 2 context misalignment. It is noted that between events 317 and 339, the Layer 2 and Layer 1 contexts are out of sync and that the forwarding of the uplink data to target DU 307 realigns the contexts, e.g., by allowing the reliability layer (for instance, an RLC sublayer) to process requests, acknowledgements, any other control information that may be present in the uplink data stored by source DU 309. In addition, forwarding the stored uplink data to target DU 307 allows the latter to know when all stored uplink data have been delivered and new uplink data from the UE can be sent to CU 311, without potentially causing out of order arrivals. The flow of uplink data from UE 305 to CU 311 is interrupted from event 317 to event 341 in the figure.

Figure 4:
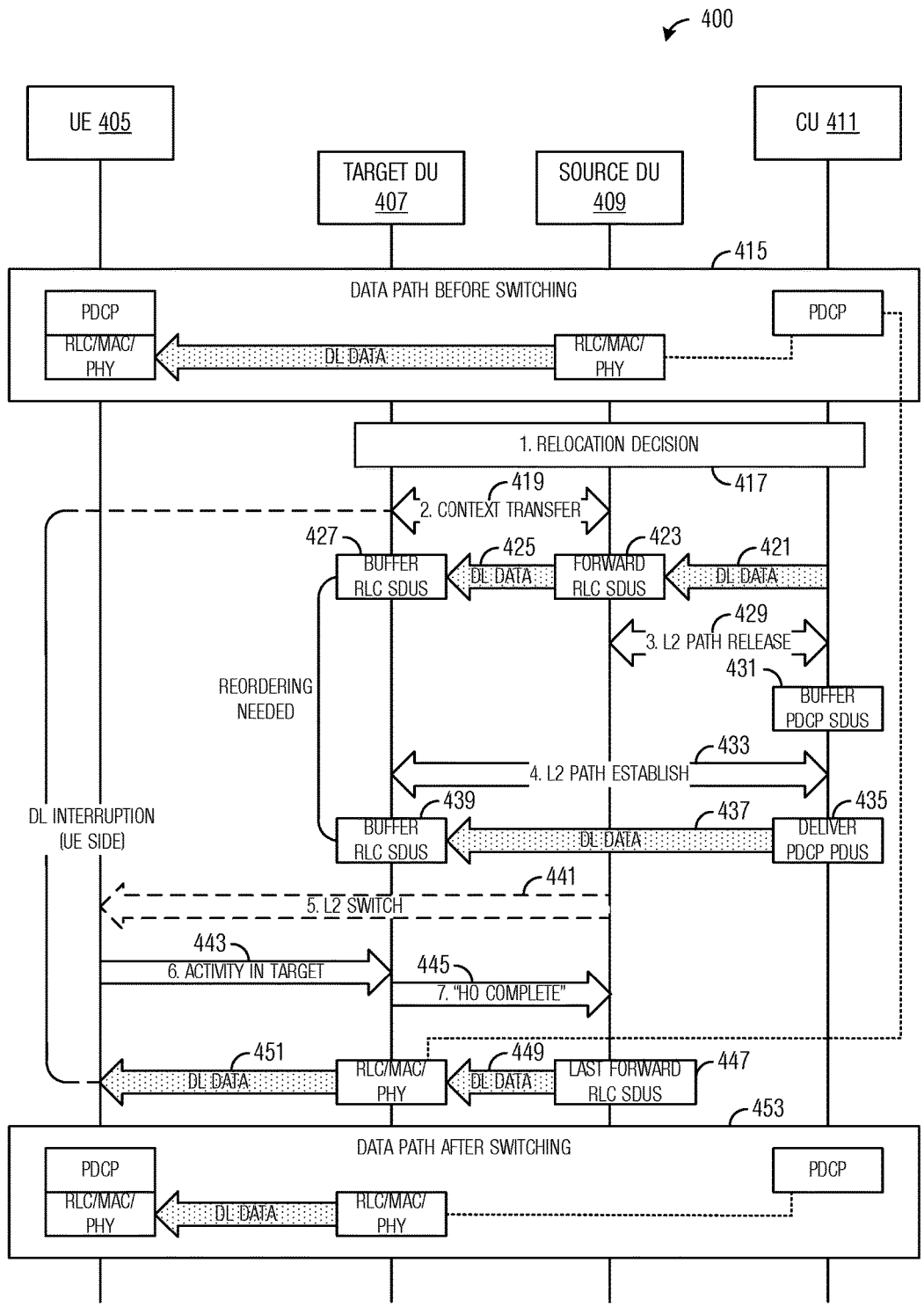
FIG. 4 illustrates a diagram of an example Layer 2 switching procedure highlighting downlink data transmission according to example embodiments described herein.

FIG. 4 illustrates a diagram 400 of an example Layer 2 switching procedure highlighting downlink data transmission. Diagram 400 illustrates messages exchanged and processing performed by a UE 405, a target DU 407, a source DU 409, and a CU 411 participating in a Layer 2 switch procedure. Block 415 illustrates the Layer 2 data path before the Layer 2 switch takes place.

A relocation decision is made based on link monitoring and measurements thereof (block 417). The relocation decision may be made by source DU 409, target DU 407, and/or CU 411. Source DU 409 and target DU 407 participate in a context transfer (event 419). After completion of the context transfer, downlink data are sent from CU 411 to source DU 423 (event 421) in the form of RLC SDUs (block 423). Source DU 409 sends the downlink data to target DU 407 (event 425) where it is buffered in the form of RLC SDUs (block 427). CU 411 and source DU 409 participate in a Layer 2 path release procedure (event 429). After completion of the Layer 2 path release procedure and before a new Layer 2 path is established between CU 411 and target DU 407, CU 411 buffers any downlink data intended for UE 405 in the form of PDCP SDUs or PDCP PDUs (block 431). It is noted that CU 411 receives PDCP SDUs and can either buffer the PDCP SDUs and then convert them into PDCP PDUs prior to sending the PDCP PDUs to target DU 407 or CU 411 can convert the received PDCP SDUs into PDCP PDUs and then buffer the PDCP PDUs prior to sending the PDCP PDUs to target DU 407. In some embodiments, the Layer 2 path release procedure (event 429) and the Layer 2 path establishment (event 433) may be considered as a single "path switch" procedure. After completion of the Layer 2 path release procedure of event 429, source DU 409 should no longer receive downlink data from CU 411. It may be possible for source DU 409 to complete downlink data forwarding prior to event 441 instead of waiting until event 445. However, there is no impact upon handover performance in either situation.

CU 411 and target DU 407 participate in the establishing of a Layer 2 path (event 433). With the Layer 2 path established, CU 411 sends the buffered PDCP PDUs (block 435) to target DU 407 (event 437) where they are buffered (block 439). It is noted that it may be necessary to reorder the buffered RLC SDUs, which may have been received from source DU 409 and CU 411. The last SDU received from source DU 409 should be delivered prior to the delivery of the first SDU from CU 411. CU 411 can continue to deliver SDUs to source DU 409 (prior to event 429) and target DU 407 (after event 433).

Source DU 409 optionally sends an airlink triggering event, such as a Layer 2 switch instruction (e.g., a MAC CE) to UE 405 (event 441). Activity between UE 405 and target DU 407 (event 443) occurs and target DU 407 sends a handover complete indication to source DU 409 (event 445). Source DU 409 sends any remaining RLC SDUs (block 447) to target DU 407 (event 449), which sends the downlink data to UE 405 (event 451). Block 453 illustrates the Layer 2 data path after the Layer 2 switch takes place.

Events 443 and 445, as shown in FIG. 4, are based on 3GPP LTE. Alternative ways for completing the handover procedure are possible. As long as target DU 407 knows when UE 405 arrives and source DU 409 knows when UE 405 is acquired by target DU 407, a variety of different approaches are possible. Therefore, the 3GPP LTE based technique should not be construed as being limiting to either the scope or spirit of the example embodiments.

Figure 5:
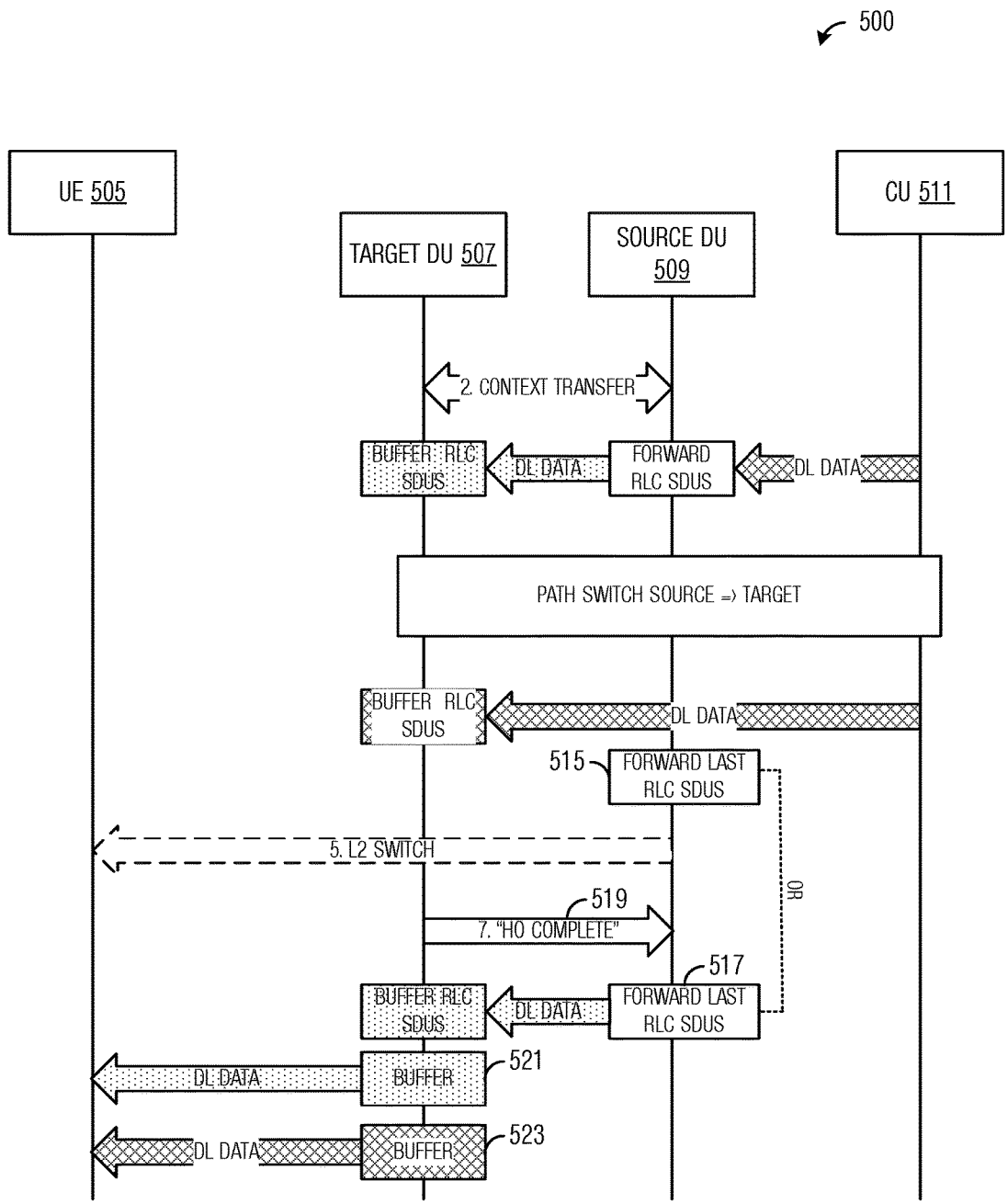
FIG. 5 illustrates a diagram of an example Layer 2 switching procedure highlighting the ordering of downlink SDUs according to example embodiments described herein.

FIG. 5 illustrates a diagram 500 of an example Layer 2 switching procedure highlighting the ordering of downlink SDUs. Diagram 500 illustrates messages exchanged and processing performed by a UE 505, a target DU 507, a source DU 509, and a CU 511 participating in a Layer 2 switching procedure.

Because target DU 507 can receive downlink data, e.g., RLC SDUs, from source DU 509 or CU 511 depending on when the downlink data is received relative to the Layer 2 path switch, it may be necessary for target DU 507 to take actions to deliver the downlink data in order. According to an example embodiment, downlink data from source DU 509 is always ordered for delivery to the UE before downlink data from CU 511, irrespective of the order in which the data arrive at target DU 507. Therefore, target DU 507 buffers the downlink data from both sources separately until source DU 509 indicates that it has forwarded the last SDU. As an example, source DU 509 can indicate that the last downlink data have been forwarded at event 515, which occurs before the completion of the handover (event 519) or event 517, which occurs after the completion of the handover (event 519). After target DU 507 receives the indication from source DU 509, then target DU 507 sends buffered downlink data from source DU 509 (event 521) followed by buffered downlink data from CU 511 (event 523).

Figure 6:
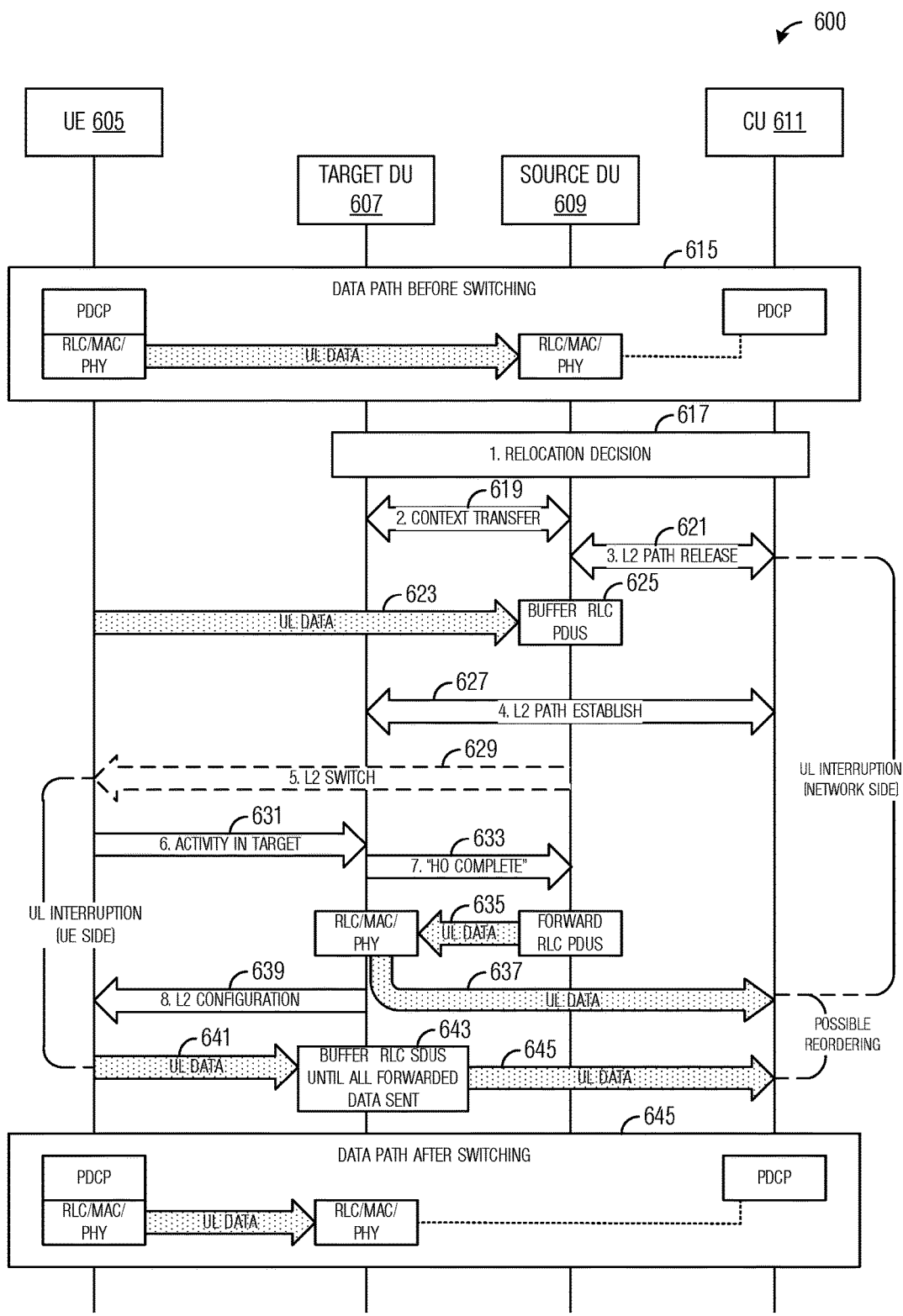
FIG. 6 illustrates a diagram of an example Layer 2 switching procedure highlighting uplink data transmission according to example embodiments described herein.

FIG. 6 illustrates a diagram 600 of an example Layer 2 switching procedure highlighting uplink data transmission. Diagram 600 illustrates messages exchanged and processing performed by a UE 605, a target DU 607, a source DU 609, and a CU 611 participating in a Layer 2 switch procedure. Block 615 illustrates the Layer 2 data path before the Layer 2 switch takes place.

A relocation decision is made based on link monitoring and measurements thereof (block 617). The relocation decision may be made by source DU 609, target DU 607, and/or CU 611. Source DU 609 and target DU 607 participate in a context transfer (event 619). Source DU 509 and CU 611 participate in a Layer 2 path release (event 621). After completion of the Layer 2 path release, UE 605 may continue to send uplink data to source DU 609 (event 623). However, since the Layer 2 path has been released, no more uplink data can be sent to CU 611 and source DU 609 buffers the data from UE 605 in the form of RLC PDUs (block 625). Source DU 609 buffers the RLC PDUs from UE 605 until a Layer 2 switch with target DU 607 is completed.

Target DU 607 and CU 611 participate in a Layer 2 path establishment (event 627). Source DU 609 optionally sends an airlink triggering event, such as a Layer 2 switch (e.g., a MAC CE) to UE 605 (event 629). Activity between UE 605 and target DU 607 (event 631) occurs and target DU 607 sends a handover complete indication to source DU 609 (event 633). Source DU 609 sends buffered uplink data to target DU 607 (event 635). The buffered uplink data is sent to target DU 607 because target DU 607 has a Layer 2 path with CU 611. Furthermore, because target DU 607 has all of the uplink data from source DU 609, target DU 607 knows when all of the uplink data from source DU 609 has been sent to CU 611 before target DU 607 sends uplink data from UE 605. The control by target DU 607 prevents CU 611 from having to reorder the uplink data. Finally, the forwarding of RLC PDUs to target DU 607 allows the PDUs to be processed by an RLC protocol entity in target DU 607, which can carry out procedures requiring an airlink connection to the UE, e.g., delivering to the UE acknowledgements for PDUs that were transmitted using an RLC acknowledged mode (RLC AM).

Target DU 607 sends the uplink data to CU 611 (event 637). Target DU 607 sends Layer 2 configuration information to UE 605 (event 639). The Layer 2 configuration information provides UE 605 with information to enable UE 605 to send uplink information to target DU 605. UE 605 sends uplink data to target DU 607 (event 641). Target DU 607 buffers uplink data from UE 605 until all uplink data from source DU 609 has been sent to CU 611 (block 643), at which time, target DU 607 sends the uplink data from UE 605 to CU 611 (event 645). Block 645 illustrates the Layer 2 data path after the Layer 2 switch takes place.

It is noted that delivering the uplink data directly to CU 611 is possible. However, CU 611 would have to ensure the correct ordering of the RLC SDUs, which implies reordering in the PDCP sublayer or an upper RLC sublayer located in CU 611.

Figures 7A, 7B:
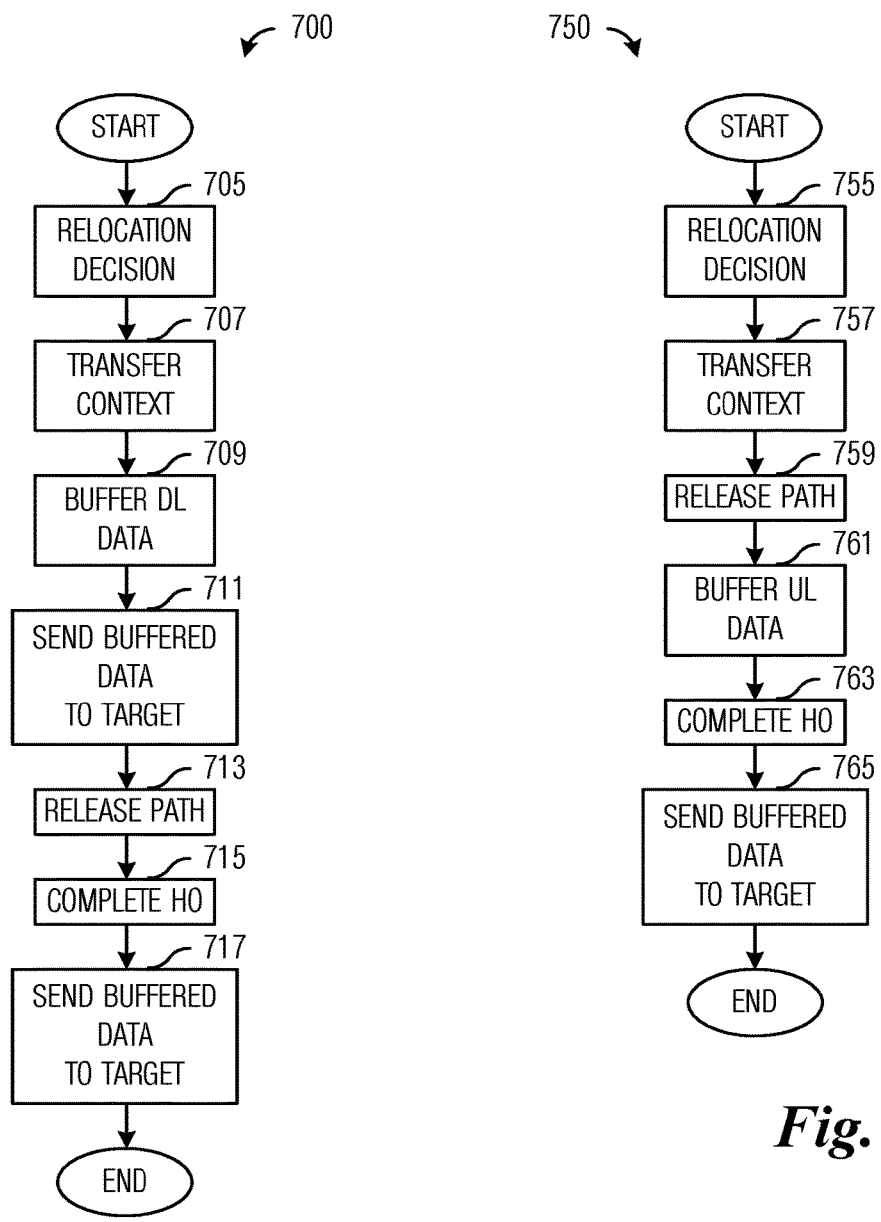
FIG. 7A illustrates a flow diagram of example operations occurring in a source DU participating in a Layer 2 switch highlighting downlink communications according to example embodiments described herein.
FIG. 7B illustrates a flow diagram of example operations occurring in a source DU participating in a Layer 2 switch highlighting uplink communications according to example embodiments described herein.

FIG. 7A illustrates a flow diagram of example operations 700 occurring in a source DU participating in a Layer 2 switch highlighting downlink communications. Operations 700 may be indicative of operations occurring in a source DU as the source DU participates in a Layer 2 switch.

Operations 700 begin with the source DU participating in a relocation decision (block 705). The relocation decision may be made with participation of the source DU, a target DU, and a CU. The relocation decision may be made in accordance with measurements of links. The source DU participates in a context transfer with the target DU (block 707). The source DU buffers downlink data from the CU (block 709) and sends the buffered downlink data to the target DU (block 711). The source DU and the CU exchange messaging to release the Layer 2 path between the source DU and the CU (block 713). The source DU may optionally send an airlink triggering event. The source DU completes the handover (block 715). Completing the handover may involve the source DU detecting activity between a UE and the target DU and the source DU receiving a handover complete indication from the target DU. The source DU forwards buffered downlink data to the target DU (block 717).

FIG. 7B illustrates a flow diagram of example operations 750 occurring in a source DU participating in a Layer 2 switch highlighting uplink communications. Operations 750 may be indicative of operations occurring in a source DU as the source DU participates in a Layer 2 switch.

Operations 750 begin with the source DU participating in a relocation decision (block 755). The relocation decision may be made with participation of the source DU, a target DU, and a CU. The relocation decision may be made in accordance with measurements of links. The source DU participates in a context transfer with the target DU (block 757). The source DU and the CU exchange messaging to release the Layer 2 path between the source DU and the CU (block 759). The source DU buffers uplink data from the UE (block 761). The source DU may optionally send an airlink triggering event. The source DU completes the handover (block 763). Completing the handover may involve the source DU detecting activity between a UE and the target DU and the source DU receiving a handover complete indication from the target DU. The source DU sends buffered uplink data to the target DU (block 765).

In a first aspect, the present application provides a method for operating a first DU. The method includes participating, by the first DU, in a link layer context transfer with a second DU, establishing, by the first DU, a user data path for a mobile device, the user data path connecting the mobile device with a CU including a radio control protocol entity communicating with the mobile device, storing, by the first DU, first user data for the mobile device received from the CU, storing, by the first DU, second user data for the mobile device received from the second DU, establishing, by the first DU, a connection with the mobile device, sending, by the first DU, the first user data and the second user data to the mobile device, and adapting, by the first DU, the link layer context to operate in the first DU for exchanging data between the CU and the mobile device, wherein adapting the link layer context includes associating an uppermost protocol layer of the first DU with a lowest protocol layer of the CU.

According to a first embodiment of the method according to the first aspect, the method includes storing, by the first DU, third user data for the CU received from the second DU, and sending, by the first DU, the third user data to the CU. According to a second embodiment of the method according to any preceding embodiment of the first aspect or the first aspect as such, the first user data is sent after sending the second user data. According to a third embodiment of the method according to any preceding embodiment of the first aspect or the first aspect as such, the first DU is a target DU and the second DU is a source DU. According to a fourth embodiment of the method according to any preceding embodiment of the first aspect or the first aspect as such, participating in the link layer context transfer includes receiving the link layer context from the second DU. According to a fifth embodiment of the method according to any preceding embodiment of the first aspect or the first aspect as such, the link layer context is for the mobile device.

FIG. 8A illustrates a flow diagram of example operations 800 occurring in a target DU participating in a Layer 2 switch highlighting downlink communications. Operations 800 may be indicative of operations occurring in a target DU as the target DU participates in a Layer 2 switch.

Operations 800 begin with the target DU participating in a relocation decision (block 805). The relocation decision may be made with participation of a source DU, the target DU, and a CU. The relocation decision may be made in accordance with measurements of links. The target DU participates in a context transfer with the source DU (block 807). The target DU buffers downlink data (block 809). The target DU and the CU exchange messaging to establish a Layer 2 path between the target DU and the CU (block 811). The target DU buffers downlink data from the CU (block 813). The target DU completes the handover (block 815).

Completing the handover may include the target DU participating in communications with the UE and sending a handover complete indication to the source DU. The target DU sends buffered downlink data to the UE (block 809).

FIG. 8B illustrates a flow diagram of example operations 850 occurring in a target DU participating in a Layer 2 switch highlighting uplink communications. Operations 850 may be indicative of operations occurring in a target DU as the target DU participates in a Layer 2 switch.

Operations 850 begin with the target DU participating in a relocation decision (block 855). The relocation decision may be made with participation of a source DU, the target DU, and a CU. The relocation decision may be made in accordance with measurements of links. The target DU participates in a context transfer with the source DU (block 857). The target DU and the CU exchange messaging to establish a Layer 2 path between the target DU and the CU (block 869). The target DU completes the handover (block 871). Completing the handover may include the target DU participating in communications with the UE and sending a handover complete indication to the source DU. The target DU buffers uplink data from the source DU as well as from the UE (block 863). The target DU sends the buffered uplink data to the CU (block 865).

In a second aspect, the present application provides a method for operating a second DU. The method includes participating, by the second DU, in a link layer context transfer with a first DU, releasing, by the second DU, a user data path for a mobile device with a CU including a radio control protocol entity communicating with the mobile device, storing, by the second DU, first user data for the mobile device received from the CU, receiving, by the second DU, a first indication indicating that a connection with the mobile device is established, and sending, by the second DU, the first user data to the mobile device.

According to a first embodiment of the method according to the second aspect, the method includes storing, by the second DU, second user data for the CU received from the mobile device, and sending, by the second DU, the second user data to the CU after receiving the first indication. According to a second embodiment of the method according to any preceding embodiment of the second aspect or the second aspect as such, the method includes sending, by the second DU, a second indication prompting the mobile device to transfer a link layer associated with the mobile device to the first DU.

FIG. 9 illustrates a flow diagram of example operations 900 occurring in a CU participating in a Layer 2 switch. Operations 900 may be indicative of operations occurring in a CU as the CU participates in a Layer 2 switch.

Operations 900 begin with the CU sending downlink data to a source DU for delivery to a UE (block 905). The CU participates in a release of a path between the CU and the source DU (block 910). Because the path has been released, the CU buffers any additional downlink data intended for the UE (block 915). The CU participates in establishing a path between the CU and a target DU (block 920). The CU sends buffered downlink data to the target DU for delivery to the UE (block 925). The CU receives uplink data (block 930).

In a third aspect, the present application provides a method for operating a CU. The method includes participating, by the CU, in a release of a first path between the CU and a first DU, storing, by the CU, first user data for a mobile device, participating, by the CU, in an establishment of a second path between the CU and a second DU, and sending, by the CU, the first user data to the second DU.

According to a first embodiment of the method according to the third aspect, the method includes sending, by the CU, second user data for the mobile device to the first DU prior to releasing the first path. According to a second embodiment of the method according to any preceding embodiment of the third aspect or the third aspect as such, the method includes receiving, by the CU, third user data from the second DU.

FIG. 10 illustrates a flow diagram of example operations 1000 occurring in a UE participating in a Layer 2 switch. Operations 1000 may be indicative of operations occurring in a UE as the UE participates in a Layer 2 switch.

Operations 1000 begin with the UE sending uplink data to a source DU, the uplink data intended for a CU (block 1005). The UE receives an airlink triggering event, such as a Layer 2 switch instruction (e.g., a MAC CE) (block 1010). The UE participates in a handover between the source DU and the target DU (block 1015). The UE receives Layer 2 configuration information for a connection between the target DU and the UE (block 1020). The UE receives downlink data from the target DU (block 1025). The UE sends uplink data to the target DU, the uplink data intended for the CU (block 1030).

In a fourth aspect, the present application provides a method for operating a mobile device. The method includes receiving, by the mobile device, an indication prompting the mobile device to transfer a link layer associated with the mobile device to a first DU, participating, by the mobile device, in a handover with the first DU and a second DU, and receiving, by the mobile device, first user data from the second DU.

According to a first embodiment of the method according to the fourth aspect, the method includes sending, by the mobile device, second user data to the first DU prior to participating in the handover. According to a second embodiment of the method according to any preceding embodiment of the fourth aspect or the fourth aspect as such, the method includes receiving, by the mobile device, Layer 2 configuration information. According to a third embodiment of the method according to any preceding embodiment of the fourth aspect or the fourth aspect as such, the method includes sending, by the mobile device, third user data to the second DU after participating in the handover. According to a fourth embodiment of the method according to any preceding embodiment of the fourth aspect or the fourth aspect as such, the Layer 2 configuration information comprises information related to a connection between the mobile device and the second DU.

In a fifth aspect, the present application provides a first DU. The first DU includes one or more processors, and a computer readable storage medium storing programming for execution by the one or more processors. The programming including instructions to configure the first DU to participate in a link layer context transfer with a second DU, establish a user data path for a mobile device, the user data path connecting the mobile device with a CU including a radio control protocol entity communicating with the mobile device, store first user data for the mobile device received from the CU, store second user data for the mobile device received from the second DU, establish a connection with the mobile device, send the first user data and the second user data to the mobile device, and adapt the link layer context to operate in the first DU for exchanging data between the CU and the mobile device, wherein adapting the link layer context includes associating an uppermost protocol layer of the first DU with a lowest protocol layer of the CU.

According to a first embodiment of the first DU according to the fifth aspect, the programming includes instructions to configure the first DU to store third user data for the CU received from the second DU, and send the third user data to the CU. According to a second embodiment of the first DU according to any preceding embodiment of the fifth aspect or the fifth aspect as such, the programming includes instructions to configure the first DU to receiving the link layer context from the second DU.

Figure 11:
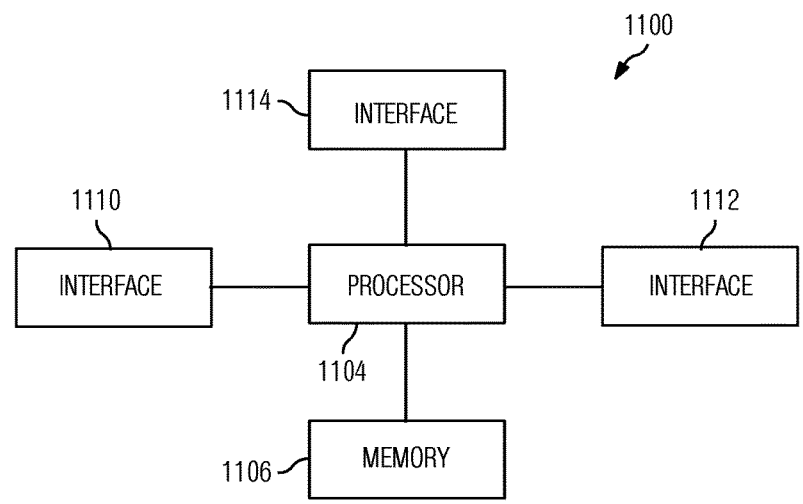
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 900 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
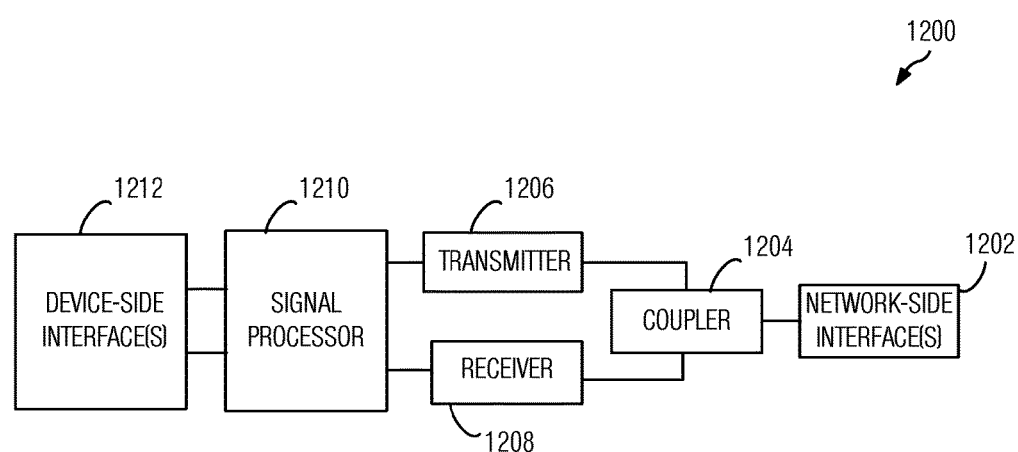
FIG. 12 illustrates a block diagram of a transceiver adapted to transmit and receive signaling over a telecommunications network according to example embodiments described herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1012 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a transferring unit/module, a storing unit/module, an establishing unit/module, and an adapting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a first distributed unit (DU), the method comprising:
   participating, by the first DU, in a link layer context transfer with a second DU;
   establishing, by the first DU, a user data path for a mobile device, the user data path connecting the mobile device with a centralized unit (CU) including a radio control protocol entity communicating with the mobile device both before and after the link layer context transfer;

storing, by the first DU, first user data for the mobile device received from the CU;

storing, by the first DU, second user data for the mobile device received from the second DU;

establishing, by the first DU, a connection with the mobile device;

sending, by the first DU, the first user data and the second user data to the mobile device; and adapting, by the first DU, the link layer context to operate in the first DU for exchanging data between the CU and the mobile device, the adapting the link layer context including associating an uppermost protocol layer of the first DU with a lowest protocol layer of the CU.

2. The method of claim 1, further comprising:

storing, by the first DU, third user data for the CU received from the second DU; and sending, by the first DU, the third user data to the CU.

3. The method of claim 1, wherein the first user data is sent after sending the second user data.

4. The method of claim 1, wherein the first DU is a target DU and the second DU is a source DU.

5. The method of claim 1, wherein participating in the link layer context transfer comprises receiving the link layer context from the second DU.

6. The method of claim 1, wherein the link layer context is for the mobile device.

7. A method for operating a second distributed unit (DU), the method comprising:

participating, by the second DU, in a link layer context transfer with a first DU;

releasing, by the second DU, a user data path for a mobile device with a centralized unit (CU) including a radio control protocol entity communicating with the mobile device both before and after the link layer context transfer;

storing, by the second DU, first user data for the mobile device received from the CU;

receiving, by the second DU, a first indication indicating that a connection with the mobile device is established; and sending, by the second DU, the first user data to the mobile device.

8. The method of claim 7, further comprising:

storing, by the second DU, second user data for the CU received from the mobile device; and sending, by the second DU, the second user data to the CU after receiving the first indication.

9. The method of claim 7, further comprising:

sending, by the second DU, a second indication prompting the mobile device to transfer a link layer associated with the mobile device to the first DU.

10. A method for operating a centralized unit (CU), the method comprising:

communicating, by a radio control protocol entity of the CU, with a mobile device, the communicating comprising sending, by the CU, first user data for the mobile device to a link layer entity of a first distributed unit (DU);

participating, by the CU, in a release of a first path between the CU and the first DU;

storing, by the CU, second user data for the mobile device;

participating, by the CU, in an establishment of a second path between the CU and a second DU; and communicating, by the radio control protocol entity of the CU, with the mobile device, the communicating comprising sending, by the CU, the second user data to a link layer entity of the second DU.

11. The method of claim 10, further comprising receiving, by the CU, third user data from the second DU.

12. The method of claim 10, wherein the first DU is a target DU and the second DU is a source DU.

13. A first distributed unit (DU) comprising:

a non-transitory memory storage comprising instructions; and one or more processors in communication with the memory storage, wherein the one or more processors execute the instructions to:

participate in a link layer context transfer with a second DU, establish a user data path for a mobile device, the user data path connecting the mobile device with a centralized unit (CU) including a radio control protocol entity communicating with the mobile device both before and after the link layer context transfer, store first user data for the mobile device received from the CU, store second user data for the mobile device received from the second DU, establish a connection with the mobile device, send the first user data and the second user data to the mobile device, and adapt the link layer context to operate in the first DU for exchanging data between the CU and the mobile device, wherein the one or more processors executing the instructions to adapt the link layer context comprises the one or more processors executing the instructions to associate an uppermost protocol layer of the first DU with a lowest protocol layer of the CU.

14. The first DU of claim 13, wherein the one or more processors execute the instructions to:

store third user data for the CU received from the second DU, and send the third user data to the CU.

15. The first DU of claim 13, wherein the one or more processors execute the instructions to receive the link layer context from the second DU.

16. The first DU of claim 13, wherein the first user data is sent after sending the second user data.

17. The first DU of claim 13, wherein the first DU is a target DU and the second DU is a source DU.

18. The first DU of claim 13, wherein the link layer context is for the mobile device.

19. A second distributed unit (DU) comprising:

a non-transitory memory storage comprising instructions; and one or more processors in communication with the memory storage, wherein the one or more processors execute the instructions to:

participate in a link layer context transfer with a first DU;

release a user data path for a mobile device with a centralized unit (CU) including a radio control protocol entity communicating with the mobile device both before and after the link layer context transfer;

store first user data for the mobile device received from the CU;

receive a first indication indicating that a connection with the mobile device is established; and send the first user data to the mobile device.

20. The second DU of claim 19, further comprising:
store second user data for the CU received from the mobile device; and
send the second user data to the CU after receiving the first indication.

21. The second DU of claim 19, further comprising:
sending, by the second DU, a second indication prompting the mobile device to transfer a link layer associated with the mobile device to the first DU.

22. A centralized unit (CU) comprising:
a non-transitory memory storage comprising instructions; and
one or more processors in communication with the memory storage, wherein the one or more processors execute the instructions to:
  communicate, by a radio control protocol entity of the CU, with a mobile device, comprising sending first user data for the mobile device to a link layer entity of a first distributed unit (DU);
  participate in a release of a first path between the CU and the first DU;
  store second user data for the mobile device;
  participate in an establishment of a second path between the CU and a second DU; and
  communicate, by the radio control protocol entity of the CU, with the mobile device, comprising sending the second user data to a link layer entity of the second DU.

23. The CU of claim 22, wherein the one or more processors execute the instructions to receive third user data from the second DU.

24. The CU of claim 22, wherein the first DU is a target DU and the second DU is a source DU.

* * * * *